United States Patent [19]

Sullenger

[11] 4,413,663
[45] Nov. 8, 1983

[54] PNEUMATIC TIRE

[76] Inventor: Gordon A. Sullenger, 3068 Kent Rd., 502C, Stow, Ohio 44224

[21] Appl. No.: 325,131

[22] Filed: Nov. 27, 1981

[51] Int. Cl.³ ............................................. B60C 13/00
[52] U.S. Cl. ........................... 152/353 R; 152/353 G; 152/354 R
[58] Field of Search ........... 152/353 R, 353 C, 353 G, 152/354 R, 354 RB; 156/116

[56] References Cited

U.S. PATENT DOCUMENTS

| | | | |
|---|---|---|---|
| 1,057,164 | 3/1913 | Messenger | 152/353 R |
| 3,128,815 | 4/1964 | Nonnamaker | 152/353 R |
| 3,258,050 | 6/1966 | Nonnamaker | 152/353 R |
| 3,382,120 | 5/1968 | Rudder | 156/116 |
| 3,449,201 | 6/1969 | Palmquist et al. | 152/353 R |
| 3,480,065 | 11/1969 | Verdier | 152/354 R |
| 3,538,972 | 11/1970 | Yurciek et al. | 152/354 R |
| 3,631,913 | 1/1972 | Boileau | 152/353 R |
| 3,853,163 | 12/1974 | Mezzanotte et al. | 152/353 R |
| 3,944,457 | 3/1976 | Podvin et al. | 156/116 |
| 4,224,268 | 9/1980 | Merli et al. | 152/353 R |

*Primary Examiner*—Edward C. Kimlin
*Assistant Examiner*—F. K. Wine
*Attorney, Agent, or Firm*—Hamilton, Renner & Kenner

[57] ABSTRACT

A pneumatic tire casing (10) having a tread portion (11) for receiving a tread (14), a pair of spaced bead portions (12,13) for mounting on a rim, a pair of sidewalls (20,21), one of said sidewalls extending between one axial extremity of said tread portion and one of said bead portions and the other of said sidewalls extending between the other axial extremity of said tread portion and the other of said bead portions, a circumferential slot (35) in at least one of the sidewalls, and an inlay ring (30) in each circumferential slot, providing stabilization and reinforcement for the sidewall, at least one inlay ring in the tire casing constituting a decorative member.

7 Claims, 6 Drawing Figures

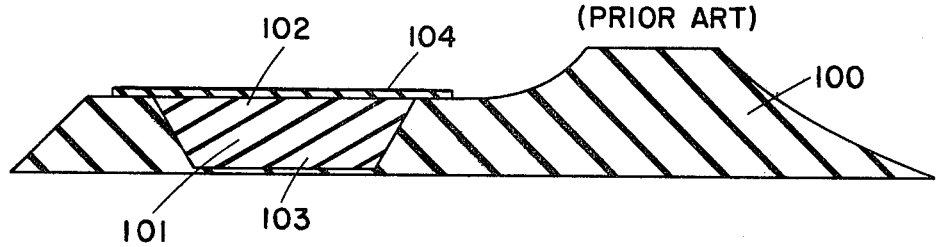
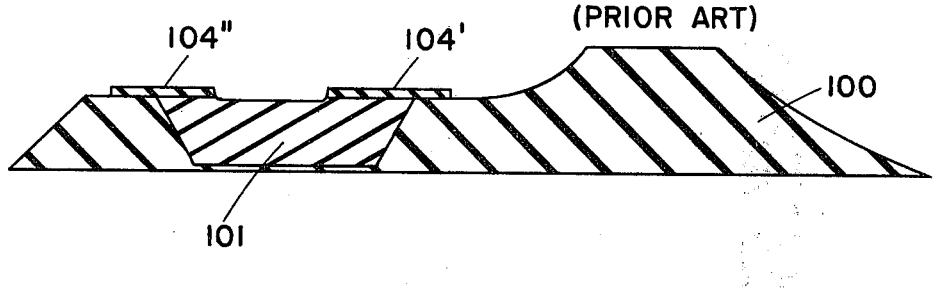
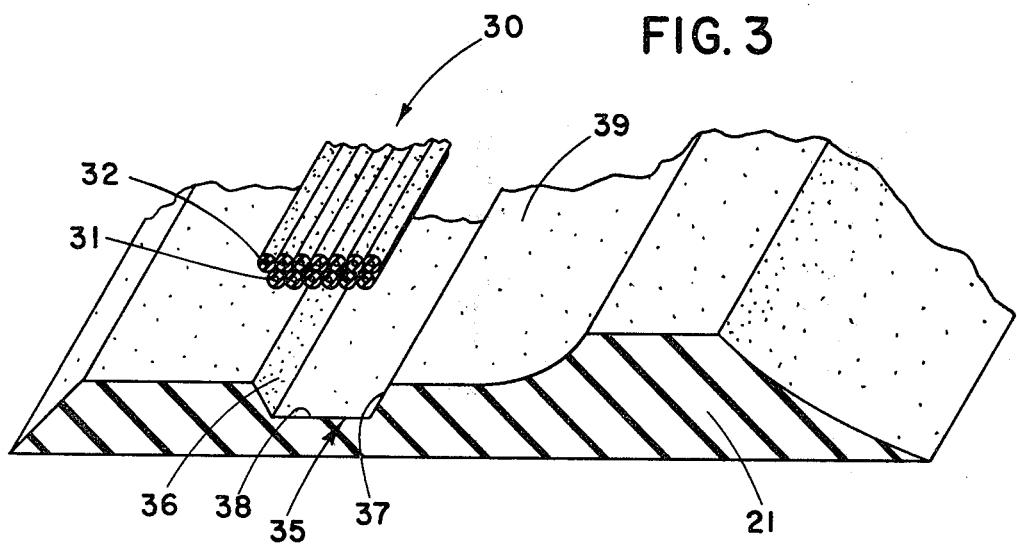

PNEUMATIC TIRE

TECHNICAL FIELD

The present invention relates generally to the construction of pneumatic tires. More particularly, the present invention relates to an improved tire construction involving the sidewall portion of pneumatic tires. More specifically, the invention relates to a tire construction which contemplates the inclusion of a decorative inlay ring in the sidewall area which provides stabilization and reinforcement of the tire sidewall.

BACKGROUND ART

The evolution of the pneumatic tire has since its early days been affected by a desire on the part of consumers, particularly in the United States, to impart an extent of color or adornment to the characteristic black coloration of pneumatic tires. As a result, the incorporation of whitewalls in a portion of the sidewalls of pneumatic tires particularly for automobiles dates back many years. More recently whitewalls have appeared in variations involving the use of a plurality of stripes, stripes in colors other than white, stripes in varying widths, and combinations of these variables. An even more recent variation of whitewall decoration for the sidewalls of pneumatic tires has taken the form of raised white or colored letters which identify the manufacturer, a designation for a particular tire configuration, or other indicia.

In all instances such color decoration for pneumatic tires has generally been effected in one of two ways. In one technique, whitewall materials are incorporated by extruding the desired colored compound simultaneously with the sidewall stock of the tire during the initial fabrication of components or building stage. In the other technique, the whitewall element is applied subsequent to the final shaping and curing of the tire.

Most common is the first technique which contemplates embedding the desired colored compound into the characteristic black sidewall stock of the tire during the extruding or the fabrication of the sidewall and prior to the first stages of tire fabrication or building. The colored compound is normally covered with a thin layer or laminate of black sidewall stock commonly referred to as a cover strip. The tire is subsequently completed in conventional fashion as in the manufacture of a standard black wall tire through the shaping and vulcanization steps. Subsequent to vulcanization, grinding or buffing equipment is employed to remove such portions of the cover strip as is required to expose the extent of colored compound necessary to achieve the predetermined desired decorative effect. While whitewall tires so constructed have enjoyed substantial commercial success, their acceptance has been somewhat restricted due to the substantial additional cost brought about by the necessity for additional processing steps. These additional processing steps also commensurately increase the probability of an imperfection in the splice area, the joinder of the colored compound to the conventional black sidewall stock or the colored area exposed such that a rejected or at least a blemished tire may result. Despite improvements in materials and processing techniques, these problems persist to an extent to the present time.

The other technique wherein the whitewall element is applied subsequent to the final shaping and curing of the tire is accomplished by generally two approaches. One approach contemplates the attachment of a colored element to the sidewall of the tire as by either bonding techniques or mechanical attachment to flaps or overhanging shoulders formed in the sidewall of a tire. In the other approach, the whitewall element is attached to the tire rim, wheel or wheel cover elements in such a manner as to overlie a portion of the sidewall of the tire to be decorated. Sidewall decorations attached according to this approach have generally not been widely accepted due to difficulty in establishing a configuration which remains permanently attached to and will not separate from the tire despite the flexural characteristics of the tire and the abuse to which tires are intermittently subjected in conjunction with normal usage.

To applicant's knowledge whitewalls produced by either of the above-discussed techniques have not been designed in such a fashion as to constitute a structural element in the tire carcass configuration. Rather, the whitewalls have been constructed in such fashion as to produce the required attachment compatibility with the tire sidewall components and to be of a material having characteristics of durability commensurate with the contemplated life of the tire.

It is, however, otherwise known to provide reinforcing components in the sidewall portions of pneumatic tires. Since conventional bias ply tire carcasses exhibit generally uniform characteristics throughout the sidewall area, reinforcement is generally not necessary to provide characteristics compatible with the operating parameters normally sought for pneumatic tires. In regard to radial ply tires, the radial compressibility and extensibility of the sidewall cord members of the carcass produce an extent of flexibility which is considered desirable in effecting comfortable ride characteristics. In order to provide the desired substantial rigidity in the tread area for reduced rolling resistance, it is in many instances desirable to increase the rigidity of the sidewalls above and below the flex point by reinforcement without sacrificing the radial compressibility and extensibility thereof; however, in most such instances a weak spot is built into the flex area, particularly where the splice of the sidewall is made during the fabrication process.

It is also known to provide reinforcement to limited areas but not all of the sidewall region so as to achieve an extent of reinforcement of the sidewall while preserving to a maximum extent the radial extensibility and compressibility characteristics. Thus, reinforcing wires, rubber cords, rods and like structural elements have been incorporated in radial tires at, for example, areas of substantial change in curvature and angled elastic cords have been incorporated over a portion of the radial extent of the carcass of radial pneumatic tires. To applicant's knowledge these sidewall reinforcing members are normally incorporated into the cord configuration of the tire carcass by overlapping, intertwining or comparable construction techniques involved in the initial fabrication or building of the tire carcass. These sidewall reinforcement elements are thus not positioned exteriorly of a tire sidewall portion such that they have constituted or could potentially constitute a decorative element of the tire.

DISCLOSURE OF THE INVENTION

Therefore, an object of the present invention is to provide a pneumatic tire having a combined sidewall decorating and reinforcing member. Another object of the invention is to provide a pneumatic tire having a decorative sidewall portion which is integrally bonded to the tire sidewall during the vulcanization process. A further object of the invention is to provide a pneumatic tire sidewall inlay ring which may be reinforced with cords to effect a predetermined extent of stabilization and reinforcement for the sidewall.

Yet another object of the invention is to provide a pneumatic tire sidewall decorative element which permits but does not require buffing, grinding or other processing steps subsequent to the vulcanization of the tire. A still further object of the invention is to provide a pneumatic tire which does not during the fabrication and processing require the application of a cover strip over the decorative sidewall elements which must be subsequently at least in part removed and will in part remain a permanent fixture on the tire. Another object of the invention is to provide a decorative sidewall inlay which may be readily adapted to a variety of decorative patterns of color varieties commonly desired in the tire industry.

Still another object of the invention is to provide a pneumatic tire sidewall reinforcing element which may be applied externally of the tire carcass and becomes an integral part of the tire. A further object of the invention is to provide a pneumatic tire sidewall reinforcing element with reinforcing characteristics which may be readily varied to effect characteristics compatible with a wide variety of pneumatic tire designs and specifications.

Yet another object of the invention is to provide a pneumatic tire decorating and reinforcing element which can be produced by adaptations of existing processes and technology. A still further object of the invention is to provide a sidewall decorating and reinforcing inlay which can be produced at prices competitive with existing technology and without excessive defects in the finished product.

In general, a pneumatic tire casing according to the concepts of the present invention includes a tread portion for receiving a tread, a portion for mounting on a rim, a pair of sidewalls, one of said sidewalls extending between one axial extremity of said tread portion and the portion for mounting on a rim and the other of said sidewalls extending between the other axial extremity of said tread portion and the portion for mounting on a rim, a circumferential slot in at least one of the sidewalls, and an inlay ring in each circumferential slot providing stabilization and reinforcement for the sidewall, at least one inlay ring in the tire casing constituting a decorative member.

BRIEF DESCRIPTION OF THE DRAWINGS

FIG. 1 is a sectional view of an exemplary prior art pneumatic tire sidewall stock extrusion having a typical whitewall insert extruded into the black with a cover strip applied in the normal condition prior to building and vulcanization.

FIG. 2 is a sectional view similar to FIG. 1 depicting a sidewall portion of a pneumatic tire subsequent to vulcanization and the grinding or buffing operation which has removed a portion of the cover strip to expose the underlying whitewall compound.

FIG. 3 is a fragmentary perspective view of the sidewall portion of a pneumatic tire embodying the concepts of the present invention depicting a fragmentary portion of the inlay ring to be inserted in a circumferential slot in the sidewall prior to vulcanization.

PREFERRED MODE FOR CARRYING OUT THE INVENTION

Figure 4:
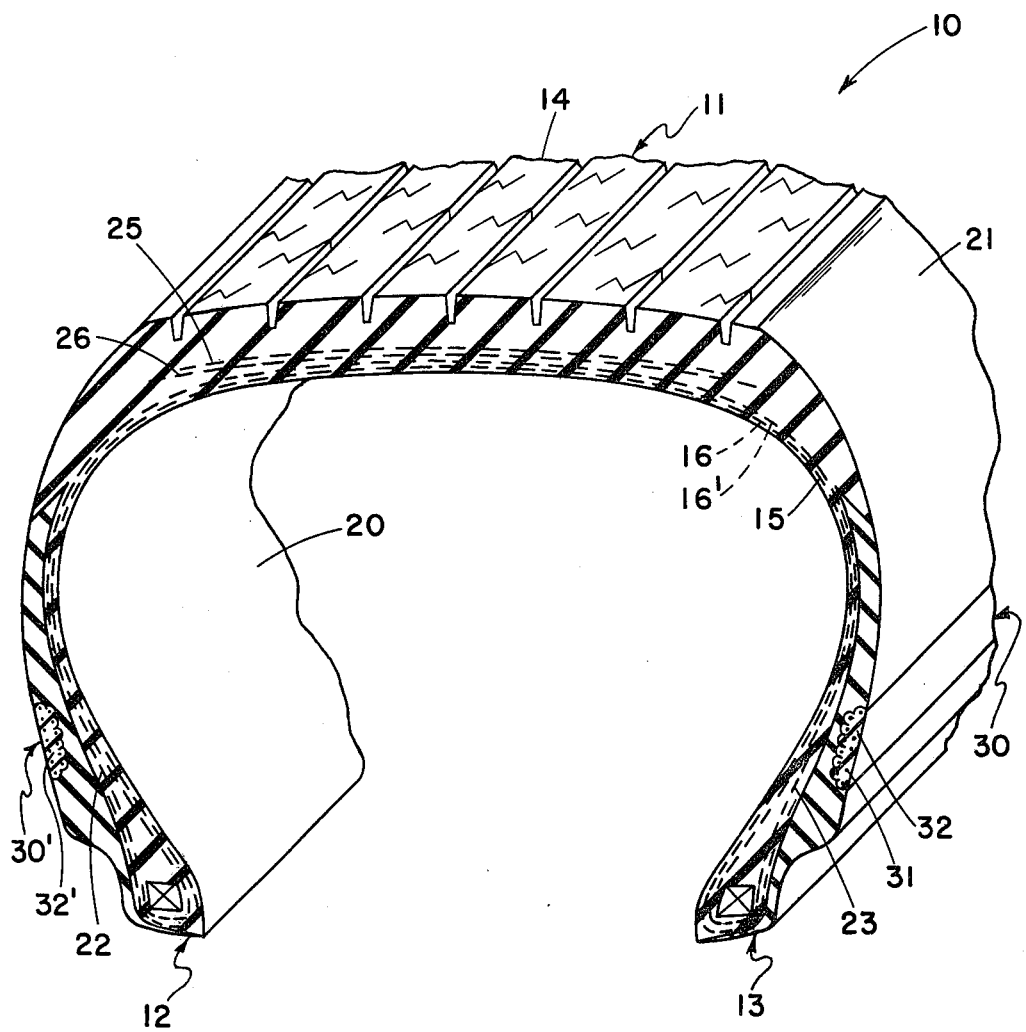
FIG. 4 is a fragmentary perspective view of a section of a pneumatic tire embodying the concepts of the present invention with decorating and reinforcing inlay rings vulcanized in both sidewalls of the tire.

To applicant's knowledge pneumatic tires having white sidewalls are virtually universally produced by a common method and result in a common type of structure, two stages of the structure during practice of the method being shown in the prior art depictions of FIGS. 1 and 2 of the drawings. Referring to FIG. 1 of the drawings a cross-section of an exemplary sidewall 100 of a pneumatic tire is shown. The sidewall configuration has a component 101 which as seen in the drawings may be generally trapezoidal in that the surface portion 102 is of greater radial width than the bottom extremity 103. The component 101 is formed of a colored compound which is formulated of a material having substantial compatability with the conventional black stock from whch the sidewall 100 is extruded. The sidewall 100, including component 101, is conventionally formed in the extruding of the sidewall by appropriately configuring the extruder die. The colored component 101 is after the extruding process and prior to the building stage covered externally of the wall of sidewall 100 by a cover strip 104 of a material which is compatible with both the colored component 101 and the conventional black sidewall stock. Once the tire building process has been completed with the sidewall configuration as depicted in FIG, 1, the tire is inserted into a curing press or vulcanizer for purposes of effcting vulcanization of the green tire components.

Subsequent to the vulcanization of the green tire the sidewall is subjected to a buffing or grinding operation to remove an intermediate portion of cover strip 104 and thereby expose a portion of the colored component 101 in accordance with a predetermined pattern. It is to be noted that the colored component 101 is normally configured such that it has a greater radial extent than that which is to be exposed by the buffing or grinding operation. This is done for the purpose of insuring that colored component 101 will be exposed in the entire portion of cover strip 104 which is buffed away in the event of minor deviations in the grinding, the positioning of the colored component 101 or other comparable factors. It is also to be appreciated that the sidewall 100 as depicted in FIG. 2 is a completed form of whitewall tire according to existing industry practices with two circumferential strips 104' and 104" remaining as permanent sidewall elements defining the boundary of the whitewall or other decorative element.

Referring now to FIG. 4 of the drawings a portion of a pneumatic tire casing in accordance with the concept of the present invention is generally indicated by the numeral 10. As shown, the tire casing 10 may be constructed basically in a conventional manner by combining a plurality of layers or plies which are integrally united one to another by a curing or vulcanizing process subsequent to the tire building operation. The various layers or plies are constituted of an elastomeric body containing reinforcing cords. The constitution and configuration of both the elastomer and the cords is normally varied between plies to carry out different functional purposes of the various plies in the overall makeup of the tire. The elastomer components may be of natural rubber or of any of a number of synthetic compositions which have been developed over the years, or combinations of both as are well known to persons skilled in the art. The cord elements may be made of networks of single filament or cable strands which are commonly of steel wire, glass fiber, rayon, nylon or other materials known to be suitable for the reinforcing function.

As shown, the tire casing 10 has as its radially external component a tread portion, generally indicated by the numeral 11, for receiving a tread 14 adpated for rolling engagement with a road surface. The tread 14 is compounded in a conventional manner to provide a desired balance between wear and traction characteristics. At the radially inner extremity of tire casing 10 opposite the tread portion 11 the tire has a pair of spaced bead portions, generally indicated by the numerals 12 and 13 which may be configured in any of a number of known ways to matingly engage a conventional vehicle rim (not shown) for which the tire 10 is designed. The tread portion 11 and the beads 12, 13 are spaced and joined in the familiar generally toroidal configuration of tire casing 10 by one or more body plies 15 which have a network of reinforcing cords 16. As shown for exemplary purposes, the tire casing 10 has two body plies 15 having individual cord networks 16 and 16'. As a distinguishing feature of a radial ply tire as contrasted with bias or bias belted tires, the cords 16, 16' of the body plies 15 are oriented in alignment with a meridian line of the tire, i.e., at a 90° angle to a circumferential plane to the tire casing 10. The body plies 15 as seen in FIG. 4 of the drawings extend from the tread area through sidewall areas 20 and 21 associated with the beads 12 and 13, respectively, and into the bead areas 12, 13. The body plies 15 may in the bead areas 12 and 13 extend around the beads 12 and 13 and have the extremities 22 and 23 terminating a distance into the sidewall areas 20 and 21, respectively.

Interposed between the tread 14 and the outermost of the body plies 15 are two or more plies which are preferably co-extensive with the tread 14 and are included for the purpose of stabilizing or providing rigidity for the tread 14 which would otherwise be subject to substantial circumferential elasticity due to the radial orientation and composition of cords 16, 16' in the body plies 15. As shown in FIG. 4 of the drawings, two stabilizer plies 25, also referred to as belts or breaker plies, are provided having reinforcing cords 26 preferably of a relatively inextensible material such as cabled steel wire so as to impart substantial circumferential rigidity or hoop strength to the overlying tread 14. It is to be appreciated that one or a plurality of stabilizer plies may be provided depending upon the design of the particular tire. The cords 26 of the stabilizer plies 25 are normally positioned at substantial angles to the radial body plies 15 with the exact orientations differing among tires and manufacturers in the industry.

It is to be understood that the foregoing description is intended only for purposes of providing a generalized description of a radial tire configuration to which the present invention is particularly adapted. The tire components depicted and those described in conjunction with FIG. 4 may be varied in numerous design particulars while maintaining a tire configuration to which the present invention may be advantageously applied and, in fact certain modifications may be desirable to compensate for alterations in performance characteristics which may accompany incorporating the concepts of the present invention in a particular tire configuration.

Referring now to FIGS. 3 and 4 of the drawings a combined sidewall decorating and reinforcing member is shown in the form of an inlay ring generally indicated by the numeral 30. As depicted in FIG. 4 the inlay ring is shown in its completed vulcanized form in the lower region of the sidewall 21 which is typical of conventional white sidewall placement. It is to be appreciated, however, that the placement of the inlay ring 30 may be varied throughout the region of the sidewall 21 as the user deems necessary to effect the reinforcement and decorative properties to be imparted to the tire 10. It is also to be appreciated that references to whitewalls, white sidewall and decorative sidewall as variously made herein is deemed to include known whitewall treatments, colored stripes other than white as well as raised or colored letters or combinations of these elements.

As best seen in FIG. 3 of the drawing, inlay ring 30 is preferably constituted as a continuous sprial reinforcing cord 31 which may be of solid wire, twisted strands of wire, glass fiber, rayon, nylon or other materials employed for reinforcing pneumatic tire components. As shown, the cord 31 is covered with a suitable elastomeric compound 32 having the color characteristics which the inlay ring 30 will impart to the tire 10 upon completion of the vulcanization process. As shown, the inlay ring 30 has two layers of cord 31 coated with the compound 32, each layer consisting of a plurality of cord windings in adjacent relationship of an extent sufficient to provide the radial extent of decorative surface desired for a particular tire configuration. It is also to be appreciated that the thickness of the elastomeric compound 32 on the cord 31 depends upon the extent of reinforcement desired for a particular tire, the number of reinforcing cords 31 required to meet design criteria, the placement of the inlay ring 30 and other design variables which will be apparent to persons skilled in the art. While a single continuous spiral reinforcing cord is deemed advantageous to provide circumferential reinforcement across or perpendicular to the sidewall splice to preclude or resist opening at the splice, it is possible that a plurality of cords could be employed to give satisfactory reinforcing characteristics. Further, either configuration can be designed to provide sufficient reinforcement and stability to eliminate or reduce any tendency for undue sidewall movement or flap particularly in tires designed for high speed operation.

The inlay ring 30 is accommodated in tire sidewall 21 by providing a circumferential slot generally indicated by the numeral 35 sized and positioned to receive the inlay ring 30 such that the axially outer surface thereof is in substantial conformity with the outside surface 36 of the sidewall 21. It will be apparent to persons skilled in the art that circumferential slot 35 may most conveniently be built into the sidewall extruding process such that sidewall 21 is extruded with circumferential slot 35 appropriately sized and positioned. As shown, the circumferential slot 35 is generally U-shaped to receive the generally annular configuration of the inlay ring 30. For ease of insertion of inlay ring 30 in slot 35, the walls 36 and 37 of the slot 35 may taper outwardly such that the cross-section of the slot is generally trapezoidal in that the portion of slot 35 at the surface 39 of sidewall area 21 is of greater radial width than the bottom 38 of slot 35 joining the walls 36 and 37.

It is to be noted that the fabrication of an inlay ring 30 of appropriate dimensions, reinforcing strength and color can be accomplished by employing technology known in the tire industry. In particular, the coating of an elastomer onto wire strands by extrusion processes is common in the art of producing bead wires for pneumatic tires, while the lamination of individually coated or extruded wires to form a ring is similar to the laminating of rubber coated bead wires into bead bundles constituting the bead portion of a pneumatic tire. Also the materials and processes for effecting the cord and elastomer adhesion qualities are akin to known techniques for fabricating stabilizer plies and other components.

Figure 5:
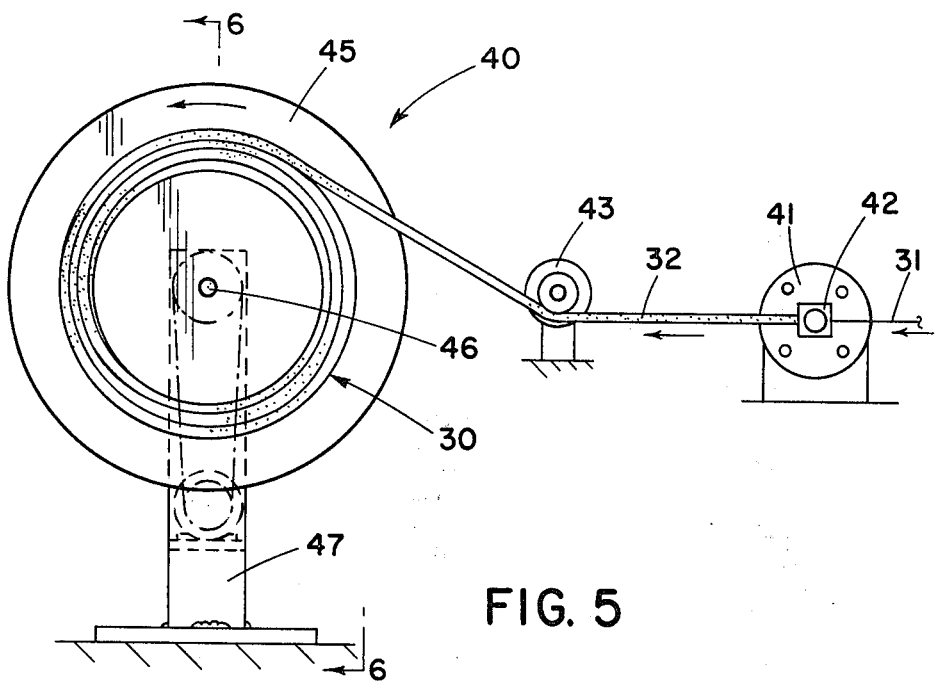
FIG. 5 is a vertical elevation shown somewhat schematically of extrusion, winding and laminating apparatus suitable for the fabrication of a sidewall inlay ring according to the present invention.
Figure 6:
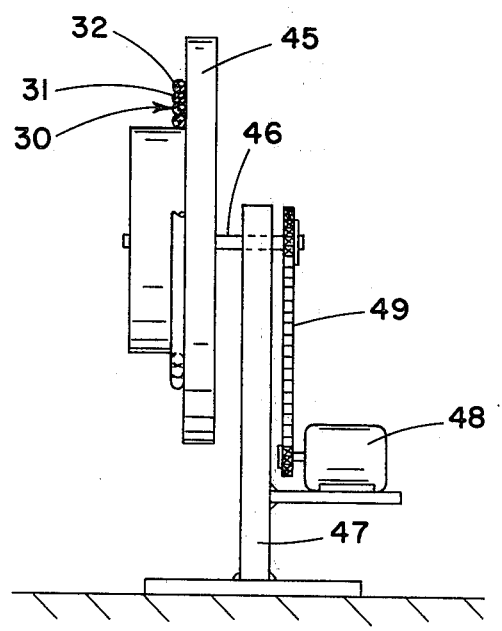
FIG. 6 is a side elevation of the winding and laminating apparatus taken substantially along line 6—6 of FIG. 5.

Exemplary bead winding apparatus, generally indicated by the numeral 40, suitable for the preparation of inlay ring 30 is depicted in FIGS. 5 and 6 of the drawings. The bead winding apparatus consists of an extruder 41 which supplies a chosen elastomeric compound 32 to a die and die holder 42. A selected strand of cord 31 is also supplied to extruder die 42 as from a conventional creel system (not shown). The die 42 applies compound 32 to the cord 31, the output being fed via a tensioning roller 43 to a wind-up wheel 45 on which the elastomeric coated cords 31 are laminated in side-by-side configuration, and layered if required for a particular inlay ring 30 configuration. Upon completion of an inlay ring 30 the coated cord 31 is severed at the wind-up wheel 45. The wind-up wheel 45 may be conventionally mounted on a shaft 46 mounted on a frame 47. The shaft 46 may be selectively powered by a motor 48 through a chain drive 49.

Once the inlay ring 30 has been laminated from a continuous spiral of cord 31, covered by elastomeric compound 32 and severed, it is removed from the wind-up wheel 45 and is ready for insertion in the circumferential slot 35. The inlay ring may in the interim be protected as is customary with respect to white or colored uncured or green tire components by a film of polyethylene, or other such material to prevent contamination, sticking and other problems attendant temporary or more extended storage. The inlay ring 30 may be positioned in the circumferential slot 35 at any time subsequent to the final tire building stage up until the closure of the tire curing press for the vulcanization operation. Insertion as part of the final stage at the tire building station or positioning in the mold for insertion during mold closure and tire shaping in the mold constitute evident times during the tire processing sequence. Inasmuch as the invention contemplates the elimination or minimizing of a buffing or grinding operation subsequent to vulcanization of the tire, mold design is preferably carried out in such a manner as to minimize material flow at the juncture of the inlay ring 30 and the tread surface 39 while permitting an extent of flow and resultant bonding interiorly of the surface.

While the above description contemplates the application of a decorative tire inlay ring 30 in only the sidewall area 21 of the tire carcass 10, which is normally the serial side of the tire, it is possible that it will be desirable in certain instances to apply a substantially identical inlay ring 30' in the other sidewall area 20 of the tire 10, which sidewall would be normally referred to as the opposite serial side. Such usage of inlay rings 30, 30' in each of the sidewall areas 20 and 21 may be necessary to achieve the symmetry, balance, conicity, ply steer and other performance characteristics required for a tire design to meet performance characteristics which may be defined from time to time. It is to be appreciated, however, that an inlay ring 30' positioned in an opposite serial side sidewall area 20 may advantageously employ an elastomeric compound 32' which is not colored and may be the conventional black sidewall compound employed in the tire. Such would also eliminate the additional storage, handling and mold design requirements indicated above with respect to white or colored elastomeric compound 32 employed in the decorative inlay ring 30.

Thus it should be evident that the pneumatic tire disclosed herein carries out the various objects of the invention set forth hereinabove and otherwise constitutes an advantageous contribution to the art. As has been noted in some instances and as will be apparent to persons skilled in the art, modifications can be made to the preferred embodiment disclosed herein without departing from the spirit of the invention, the scope of the invention being limited solely by the scope of the attached claims.

I claim:

1. A pneumatic tire casing comprising a tread portion for receiving a tread, beam means for mounting on a rim, a pair of sidewalls, one of said sidewalls extending between one axial extremity of said tread portion and said means for mounting on a rim and the other of said sidewalls extending between the other axial extremity of said tread portion and said means for mounting on a rim, a circumferential slot in at least one of said sidewalls, and inlay ring means integrally bonded in each said circumferential slot in said sidewalls during vulcanization of said sidewalls, said inlay ring means constituted of rubber having reinforcing cord means providing stabilization and reinforcement for said sidewall, said reinforcing cord means being constituted of a continuous spiral of reinforcing cord, at least one inlay ring means in the tire casing constituting a decorative member.

2. A pneumatic tire casing according to claim 1, having circumferential slot means in each of said pair of sidewalls.

3. A pneumatic tire casing according to claim 1, wherein said reinforcing cord means extend circumferentially of said sidewall.

4. A pneumatic tire casing according to claim 1, wherein said inlay ring means has a plurality of layers of reinforcing cords.

5. A pneumatic tire casing according to claim 1, wherein said inlay ring means is of generally annular configuration.

6. A pneumatic tire casing according to claim 1, wherein said circumferential slot means is generally U-shaped in cross-section and said inlay ring means is configured for substantially mating engagement.

7. A pneumatic tire casing according to claim 6, wherein said circumferential slot means is of greater radial width at the surface of said circumferential slot means than at the bottom thereof.

* * * * *